United States Patent
Yamasaki et al.

(10) Patent No.: US 8,248,031 B2
(45) Date of Patent: Aug. 21, 2012

(54) METHOD FOR PRIORITIZING LOAD CONSUMPTION WITHIN A NOTEBOOK COMPUTER

(75) Inventors: Noritoshi Yamasaki, Machida (JP); Keiji Suzuki, Fujisawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 364 days.

(21) Appl. No.: 12/420,099

(22) Filed: Apr. 8, 2009

(65) Prior Publication Data

US 2009/0309419 A1    Dec. 17, 2009

(30) Foreign Application Priority Data

Jun. 12, 2008 (JP) ................................ 2008-154381

(51) Int. Cl.
*H02J 7/00* (2006.01)
(52) U.S. Cl. .. 320/124; 320/125; 320/160; 320/DIG. 11
(58) Field of Classification Search .............. 307/31–35, 307/38, 39, 41; 320/124, DIG. 11, 125, 160
See application file for complete search history.

(56) References Cited

U.S. PATENT DOCUMENTS

| | | | |
|---|---|---|---|
| 3,894,244 A * | 7/1975 | Hill ................. | 307/16 |
| 4,034,233 A * | 7/1977 | Leyde .............. | 700/295 |
| 5,200,685 A * | 4/1993 | Sakamoto .......... | 320/103 |
| 6,392,383 B1 * | 5/2002 | Takimoto et al. ... | 320/115 |
| 7,420,293 B2 * | 9/2008 | Donnelly et al. ... | 307/34 |
| 7,746,036 B2 * | 6/2010 | Wolf et al. ........ | 320/162 |
| 7,781,908 B2 * | 8/2010 | DuBose et al. ..... | 307/31 |
| 7,847,520 B2 * | 12/2010 | Veselic et al. ...... | 320/137 |
| 2003/0011486 A1 * | 1/2003 | Ying ............ | 340/825.69 |
| 2003/0020333 A1 * | 1/2003 | Ying ............... | 307/38 |
| 2004/0164708 A1 * | 8/2004 | Veselic et al. ..... | 320/132 |
| 2006/0075266 A1 * | 4/2006 | Popescu-Stanesti et al. . | 713/300 |
| 2009/0230769 A1 * | 9/2009 | Aerts .............. | 307/32 |
| 2010/0079000 A1 * | 4/2010 | Yamamota et al. ... | 307/39 |

FOREIGN PATENT DOCUMENTS

| | | |
|---|---|---|
| JP | 09-037483 | 2/1997 |
| JP | 10-055868 | 2/1998 |
| JP | 10-091290 | 4/1998 |
| JP | 10-198468 | 7/1998 |
| JP | 2000-089862 | 3/2000 |
| JP | 2000-172387 | 6/2000 |
| JP | 2001-186680 | 7/2001 |
| JP | 2001-331242 | 11/2001 |
| JP | 2007-072962 | 3/2007 |
| JP | 2007-102008 | 4/2007 |
| JP | 2007-233894 | 9/2007 |
| JP | 2007-272341 | 10/2007 |

* cited by examiner

*Primary Examiner* — Drew A Dunn
*Assistant Examiner* — Manuel Hernandez
(74) *Attorney, Agent, or Firm* — Antony P. Ng; Yudell Isidore Ng Russell PLLC (57) ABSTRACT

A function extending apparatus for receiving a portable computer is disclosed. The function extending apparatus includes an AC/DC adapter, a second charging system and a controller. The AC/DC adapter is capable of supplying power to the portable computer equipped with a system load and a first charging system having a first charger and a first battery. The second charging system of the function extending apparatus includes a second charger and a second battery. The controller reduces power consumption of the second charging system when the output power of the AC/DC adapter reaches a first threshold value. The controller reduces power consumption of the first charging system when the output power of the AC/DC adapter reaches a second threshold value, wherein the second threshold value is higher than the first threshold value.

11 Claims, 4 Drawing Sheets

METHOD FOR PRIORITIZING LOAD CONSUMPTION WITHIN A NOTEBOOK COMPUTER

PRIORITY CLAIM

The present application claims benefit of priority under 35 U.S.C. §§120, 365 to the previously filed Japanese Patent Application No. JP2008-154381 entitled, "Power Consumption Control System and Power Consumption Control Method" with a priority date of Jun. 12, 2008, which is incorporated by reference herein.

BACKGROUND OF THE INVENTION

1. Technical Field

The present invention relates to power supplies in general, and in particular to a method for controlling output power of an AC/DC adapter and power consumption of a load within a notebook type portable computer.

2. Description of Related Art

A notebook type portable computer (notebook PC) has a relatively simple system configuration when being used in a mobile environment in order to prolong battery-powered operating time. On the other hand, when being used in an office environment, the notebook PC can be connected to a function extending apparatus known as a docking station or a port replicator so that a user can utilize the features and capabilities corresponding to a desktop computer. The notebook PC is generally equipped with a charger, and in some cases, a special charger is also mounted on the function extending apparatus.

When the notebook PC is used in a state of being connected to a function extending apparatus, an AC/DC adapter is not connected directly to the notebook PC but the AC/DC adapter preliminarily connected to the function extending apparatus supplies power to a system load of the notebook PC, a charger of the notebook PC, a system load of the function extending apparatus, and a charger of the function extending apparatus. Among the system load, a central processing unit (CPU) exhibits the largest maximum power consumption. The AC/DC adapter has rated power suitable for the maximum power consumption of the entire of the system load including the CPU. The variation in the power consumption of the system load is severe, and charging the battery by means of the charger is not always an urgent task. Therefore, when the rated power of the AC/DC adapter is set to be larger than the sum of the total maximum power consumption of the system load and the maximum power consumption of the charger, the utilization rate of the AC/DC adapter may decrease, and thus, the battery is overcharged.

Therefore, the charging of a battery by means of a charger is generally carried out by using surplus power that is a difference between the rated power of the AC/DC adapter and the power consumption of the system load. In this case, when the notebook PC is used in a state of being connected to the function extending apparatus, power is supplied from the AC/DC adapter connected to the function extending apparatus, to the system load of the notebook PC, the system load of the function extending apparatus, the charger of the notebook PC, and the system load of the function extending apparatus. However, depending on the overall power consumption or the output power of the AC/DC adapter, it may be necessary to limit the power consumption of any of the loads.

Generally, in a notebook PC that does not limit the power consumption of a system load, the power consumption of either the charger of the notebook PC or the charger of the function extending apparatus (or both chargers) can be limited when the power consumption of the system load increases. One method to control the power consumption of either one or both of the chargers can be based on the measurement results of the power consumption of the charger of the notebook PC and the power consumption of the charger of the function extending apparatus. Specifically, a configuration may be considered in which when output power of an AC/DC adapter exceeds a predetermined value, the power consumption of the charger of the notebook PC is compared with the power consumption of the charger of the function extending apparatus so that the larger power consumption is limited.

However, with such a method, in order to limit the power consumption of the charger of the notebook PC or the charger of the function extending apparatus, it is necessary to acquire information regarding the power consumption of both chargers. The AC/DC adapter needs to supply power to the function extending apparatus connected to the notebook PC or the function extending apparatus not connected to the notebook PC. Therefore, when the notebook PC is not connected to the function extending apparatus, it is impossible to acquire information of the charger of the notebook PC, and thus, it is difficult to employ the above-mentioned method.

Consequently, it would be desirable to provide an improved method for controlling output power of an AC/DC adapter and power consumption of a load within a notebook PC.

SUMMARY OF THE INVENTION

In accordance with a preferred embodiment of the present invention, a function extending apparatus for receiving a portable computer includes an AC/DC adapter, a second charging system and a controller. The AC/DC adapter is capable of supplying power to the portable computer equipped with a system load and a first charging system having a first charger and a first battery. The second charging system of the function extending apparatus includes a second charger and a second battery. The controller reduces power consumption of the second charging system when the output power of the AC/DC adapter reaches a first threshold value. The controller reduces power consumption of the first charging system when the output power of the AC/DC adapter reaches a second threshold value, wherein the second threshold value is higher than the first threshold value.

All features and advantages of the present invention will become apparent is in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
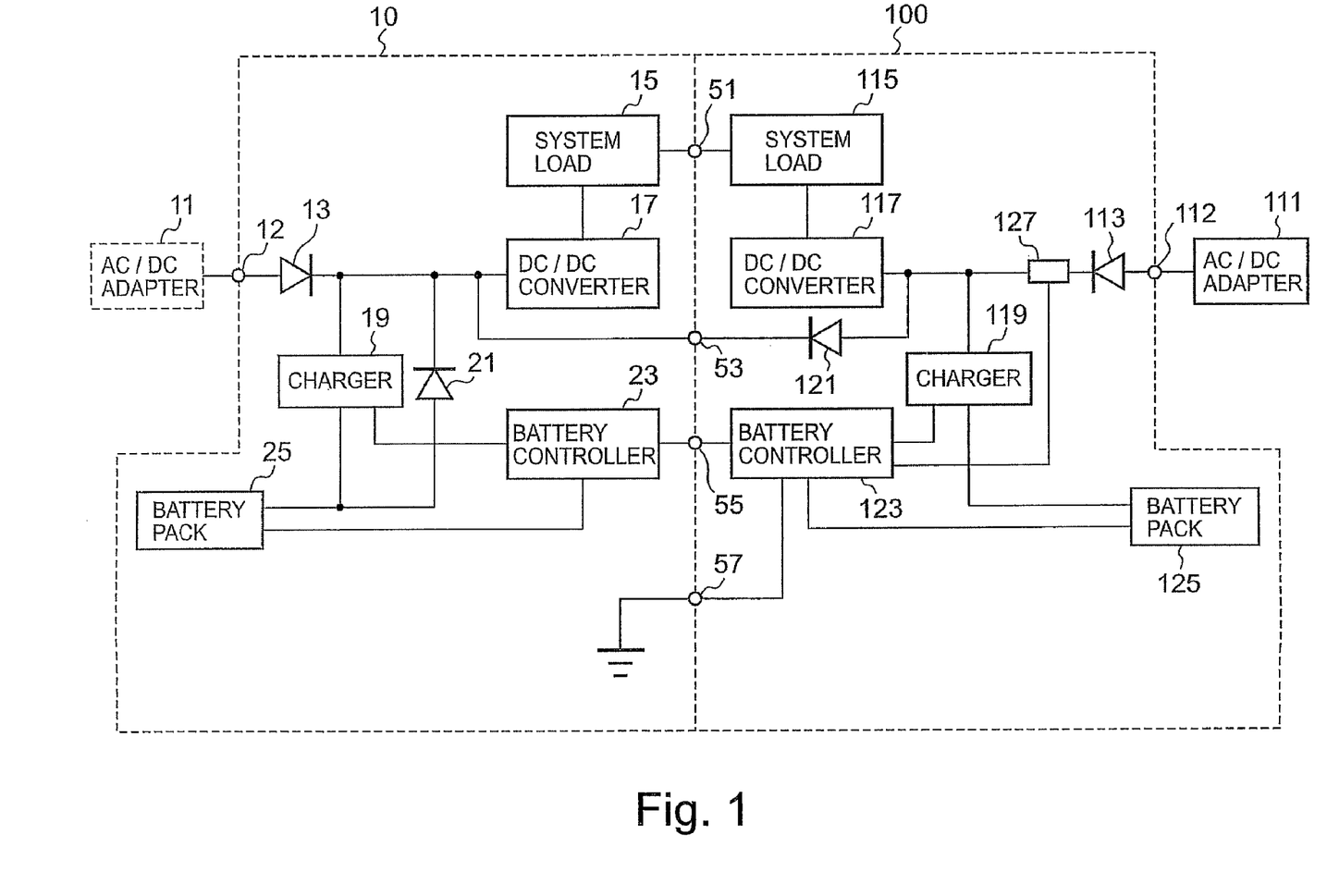
FIG. 1 is a block diagram of a power control system.

Referring now to the drawings and in particular to FIG. 1, there is depicted a block diagram of a charging circuit when a notebook type portable computer (notebook PC) 10 is connected to a docking station 100. The notebook PC 10 can be used in a stand-alone state or in a state of being connected to the docking station 100. The notebook PC 10 is equipped with a system load 15 such as a processor, a main memory, a system bus, and a hard disk drive. When the notebook PC 10 is used in an office environment without being connected to the docking station 100, an AC/DC adapter 111 is able to supply power to a charger 19 by being connected to a power jack 12 and to the system load 15 while charging a battery pack 25.

A DC/DC converter 17 receives power from the AC/DC adapter 11 via a diode 13. The DC/DC converter 17 receives power from the battery pack 25 via a diode 21 when the AC/DC adapter 11 is not connected to the power jack 12. The DC/DC converter 17 converts a DC voltage received from the AC/DC adapter 11 or the battery pack 25 to various stable DC voltages to be supplied to the system load 15.

A charger 19 operates in accordance with a constant-current/constant-voltage (CCCV) control method. The charger 19 converts the DC voltage supplied by the AC/DC adapter 11 to a predetermined voltage appropriate for charging by chopper control such as PWM or PFM. The charger 19 operates such that an output current or output voltage measured per se becomes identical with a setting value of a charging current or a setting value of a charging voltage. The battery pack 25 is an intelligent battery in compliant with the smart battery system (SBS) standards. The battery pack 25 is removably attached to a battery bay of the notebook PC 10. In the battery pack 25, a secondary battery, a controller, a current detection circuit, a voltage detection circuit, a protection device, and the like are accommodated. The controller of the battery pack 25 measures a voltage and a current of the secondary battery and calculates remaining capacity thereof to be stored as data. It should be noted that the present invention can also be applied to a system for charging a battery that is not compliant with the SBS standards.

A battery controller 23 is configured by a processor, a ROM, a RAM, an EEPROM, and the like and is connected to devices included in the system load 15 via a bus. The battery controller 23 is connected to the battery pack 25 via a PM bus, so that the setting value of the charging voltage and the setting value of the charging current which are set to the charger 19 or other data can be received from the processor of the battery controller 23. The battery controller 23 sets the setting value of the charging voltage and the setting value of the charging voltage received from the battery pack 25 to the charger 19. The battery controller 23 is able to recognize whether or not the battery pack 25 is attached to the battery bay of the notebook PC 10 by a well-known method. Moreover, the charger 19 and the battery controller 23 are parts of the system load 15.

When used in an office environment, the notebook PC 10 is able to utilize extended features and capabilities by connecting to the docking station 100 which is a function extending apparatus. Although the function extending apparatus is sometimes called a port replicator when it does not possess a device serving as a bus master, the function extending apparatus according to the present embodiment is provided with at least a charging system and a charging control function. The docking station 100 is equipped with a system load 115 such as an optical drive, a hard disk drive, a LAN card, a USB interface, and a video card.

The notebook PC 10 is able to recognize and access the system load 115. The docking station 100 is always connected to an externally attached display, a LAN cable, an externally attached keyboard, and the like so that it is possible to use the notebook PC 10 when it is connected to the docking station 100. A battery pack 125 is compatible with the battery pack 25 and is removably attached to a battery bay of the docking station 100.

An AC/DC adapter 111 is able to supply power to the system load 115 and a charger 119 via a diode 113 by being connected to a power jack 112 even when the notebook PC 10 is not connected to the docking station 100. When the notebook PC 10 is connected to the docking station 100, the power jack 12 of the notebook PC 10 is configured to be concealed by a casing of the docking station 100, and thus, it is unable to use the AC/DC adapter 11. Instead of this, the AC/DC adapter 111 also supplies power to the DC/DC converter 17 and the charger 19 of the notebook PC 10.

The charger 119 has the same configuration as the charger 19. A battery controller 123 has the same features of controlling the charger 119 and the battery pack 125 as the battery controller 23 controlling the charger 19 and the battery pack 25. Specifically, the battery controller 123 sets a setting value of a charging current and a setting value of a charging voltage received from the battery pack 125 to the charger 119. The battery controller 123 is able to change the setting value of the charging current of the charger 119 stepwise by an every predetermined step value. The battery controller 123 delivers the setting value of the charging current of the charger 19 to the battery controller 23 and instructs the battery controller to change the setting value for each of the predetermined step values. At this time, the battery controller 23 changes the setting value of the charging current of the charger 19 in accordance with the instruction of the battery controller 123.

A program allowing the battery controller 123 to change the setting value of the charging current of the charger 119 is stored in an EEPROM for the battery controller 123. The program can be executed to control power consumption according to the present invention. The battery controller 123 holds in a program thereof the rated power Pa (W) of the AC/DC adapter 111, a first threshold value Th1 (W), and a second threshold value Th2 (W). The rated power value Pa, first threshold value Th1 and second threshold value Th2 satisfy the relations of: Pa>Th2>Th1.

A power detector 127 includes a sense resistor for current detection and supplies two analog voltage values corresponding to an output voltage and an output current of the AC/DC adapter 111 to the battery controller 123. Upon receiving the analog voltage values from the power detector 127, the battery controller 123 calculates the output power of the AC/DC adapter 111. Moreover, the charger 119 and the battery controller 123 are parts of the system load 115.

The DC/DC converter 117 is able to receive power from the AC/DC adapter 111 via the diode 113 when the AC/DC adapter 111 is connected to the power jack 112 but is unable to receive power when the AC/DC adapter 111 is not connected to the power jack 112. The notebook PC 10 and the docking station 100 are connected via connectors 51, 53, 55 and 57. The connectors 51 and 55 are connected, for example, to an LPC bus and a PCI-Express bus of the notebook PC 10 and the docking station 100. The buses of the notebook PC 10 are extended to an inside of the docking station 100 via the connector 51 and 55, whereby the notebook PC 10 is able to recognize and utilize the system load 115 of the docking station 100.

The connector 53 supplies power from the AC/DC adapter 111 to the system load 15 and the charger 19 of the notebook PC 10 via a diode 121. The connector 57 is connected to the ground potential of the notebook PC 10 and the battery controller 123 and transfers a signal when the battery controller 123 detects that the notebook PC 10 is connected to the docking station 100.

When the notebook PC 10 is connected to the docking station 100 and the system loads 15 and 115 operate, power is supplied from the AC/DC adapter 111 to the system loads 15 and 115 and the chargers 19 and 119. Therefore, if the rated power of the AC/DC adapter 111 is higher than the sum of the maximum power consumption of all these loads, there is no need to impose any restriction on charging of the battery packs 25 and 125. However, since the power consumption of the system loads 15 and 115 and the chargers 19 and 119 varies greatly, when the rating capacity of the AC/DC adapter 111 is set to be higher than the sum of the maximum power consumption of the loads, the utilization rate of the AC/DC adapter 111 may decrease, and thus, it is not economically desirable.

In the present embodiment, the rated power of the AC/DC adapter 111 is set to be equal to or higher than the maximum power consumption of the system loads 15 and 115 but is set to be unable to operate both the charger 19 and the charger 119 when the system loads 15 and 115 are operating with the maximum power consumption. Therefore, the charging of the battery pack 25 by means of the charger 19 and the charging of the battery pack 125 by means of the charger 119 are basically carried out by surplus power of the AC/DC adapter 111 relative to the power consumption of the system loads 15 and 115.

When a user uses the notebook PC 10 in a state of being connected to the docking station 100 after using the notebook PC 10 in a mobile environment, the user typically prefers to place the first priority on the work performance of the notebook PC 10, and then places the second priority on the charging of the battery pack 25 such that the changing can be completed as quick as possible. That is, when the notebook PC 10 is used in a state of being connected to the docking station 100, the power from the AC/DC adapter 111 is sequentially supplied to the system loads 15 and 115, the charger 19 and the charger 119 in the order of a priority thereof. In the present embodiment, paying attention to this priority, when power is supplied from one source of the AC/DC adapter 111 to multiple destinations, the chargers 19 and 119 and the system loads 15 and 115, the power consumption of the charger 19 and the charger 119 is controlled while maintaining the rated power of the AC/DC adapter 111.

A power consumption control method based on the above-mentioned priority will now be provided. When the system load 15 and the system load 115 are collectively treated as one system load 15/115 in the computer system illustrated in FIG. 1, three loads, i.e., the system load 15/115, the charger 19 and the charger 119, are present as one single load to the AC/DC adapter 111. In the present embodiment, the power consumed by the system load 15/115, the charger 19 and the charger 119 is controlled by the battery controller 123 on the basis of only the output power of the AC/DC adapter 111. The battery controller 123 controls the power consumption by executing the above-mentioned program stored within the EEPROM.

Figure 2:
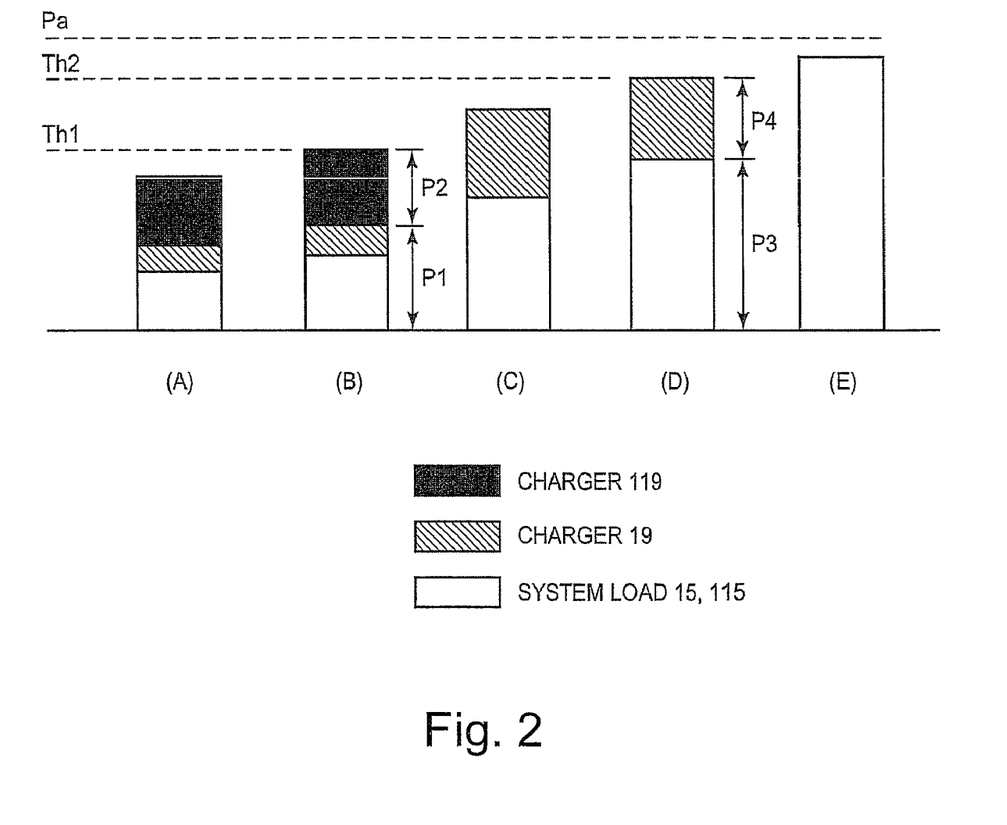
FIG. 2 illustrates a method for controlling output power of an AC/DC adapter and power consumption of a load.
Figure 3:
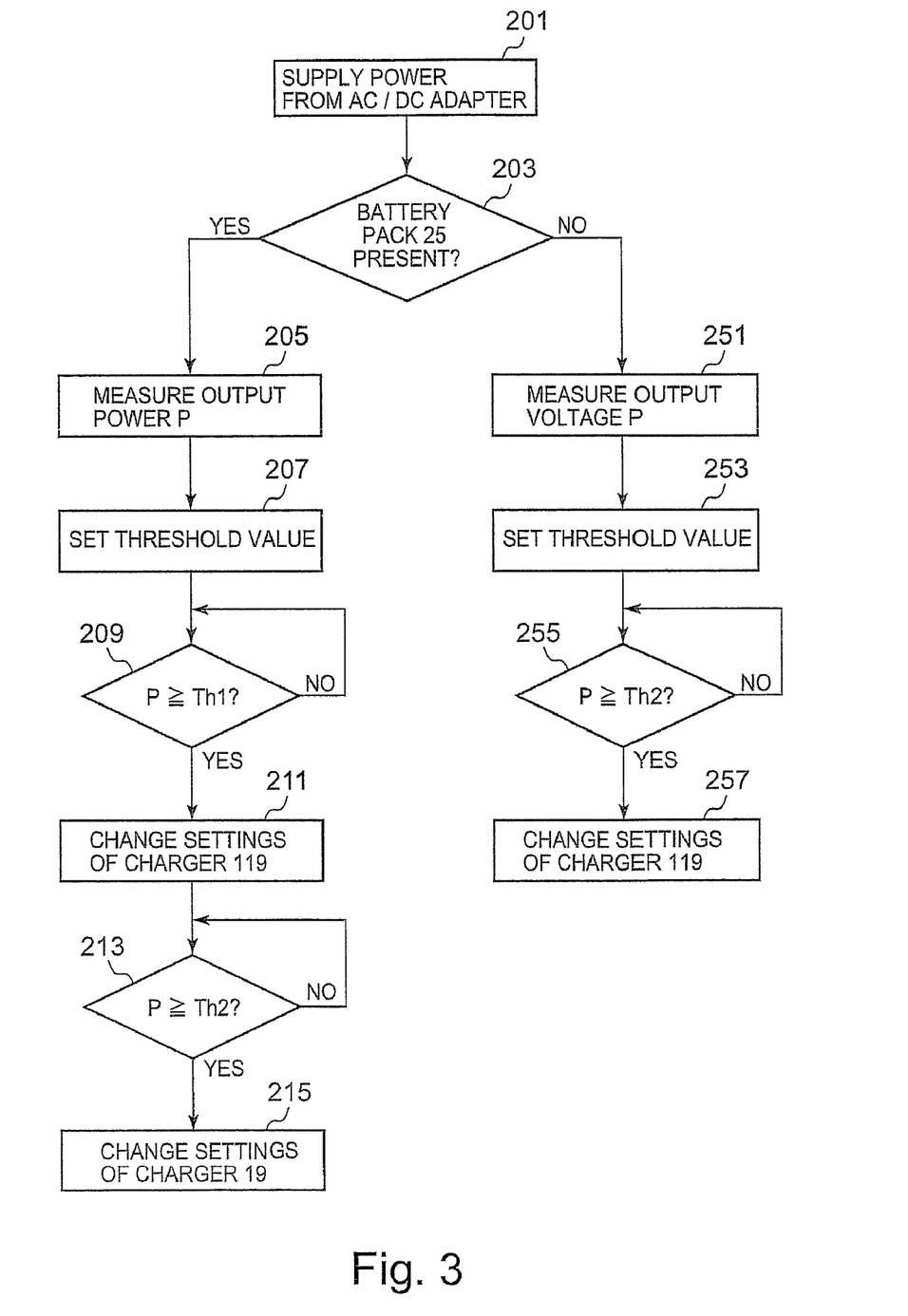
FIG. 3 is a flow chart of a method for controlling power consumption of a load.

FIG. 2 is a diagram for illustrating a method of controlling the output power of the AC/DC adapter 111 and the power consumption of the load, and FIG. 3 is a flow chart of the above-mentioned method. As an example, it is assumed that the rated power Pa of the AC/DC adapter 111 is 65 W, the maximum power consumption of the charger 19 is 54 W, and the maximum power consumption of the charger 119 is also 54 W. Moreover, it is assumed that the maximum power consumption of the system load 15/115 is 65 W. Furthermore, it is assumed that the maximum power consumption of the system load 15/115 when considering the margin thereof does not exceed the rated power Pa of the AC/DC adapter 111. Here, the sum of the maximum power consumption of the loads is 173 W (i.e., 65 W+54 W+54 W), which exceeds the rated power Pa. Moreover, in FIG. 2, the first threshold value Th1 is set to 33 W, and the second threshold value Th2 is set to 54 W, so that the second threshold value Th2 has a higher priority than the first threshold value Th1.

In block 201 of FIG. 3, it is assumed that the notebook PC 10 equipped with the battery pack 25 and the AC/DC adapter 111 are connected to the docking station 100, and that the docking station 100 is equipped with the battery pack 125. Moreover, in the chargers 19 and 119, the setting value of a standard charging voltage and the setting value of a standard charging current obtained from the corresponding battery packs 25 and 125 are set by the battery controllers 23 and 123. Therefore, the chargers 19 and 119 start charging in a standard charging mode upon receiving power from the AC/DC adapter 111.

When charging is performed by the constant-current/constant-voltage control method, the power consumption of the chargers 19 and 119 increases with the battery voltage when they are operating in a constant current region, becomes the maximum when they switch from a constant current mode to a constant voltage mode, and decreases after they transition to the constant voltage mode. In block 201, the power consumption of the chargers 19 and 119 is determined by the remaining capacity of the battery packs 25 and 125 at that moment. In block 203, the battery controller 123 makes a determination as to whether or not the notebook PC 10 is connected to the docking station 100 based on whether or not a line connected to the connector 57 is at the ground potential.

Since the battery pack 25 is generally mounted on the notebook PC 10, when the battery controller 123 has determined that the notebook PC 10 is connected to the 10 docking station 100, it is reasonable to conclude that a charging system that includes the battery pack 25 and the charger 19 is present as a load to the AC/DC adapter 111. The charging system does not consume power when the battery pack is not mounted. Because the present invention can be applied to a case where the notebook PC 10 is equipped with multiple charging systems, each charging system including multiple auxiliary battery packs, is when it is determined that the notebook PC 10 is connected to the docking station 100, the battery controller 123 may make inquiries to the battery controller 23 to determine whether or not the battery pack 25 is actually mounted on the notebook PC 10.

When it is determined that the battery pack 25 is mounted on the notebook PC 10, the flow proceeds to block 205. When it is determined that the notebook PC 10 is not connected to the docking station 100 or that the notebook PC 10 is connected to the docking station 100 but the battery pack 25 is not mounted on the notebook PC 10, the flow proceeds to block 251. In block 205, the AC/DC adapter 111 supplies power to the system load 15/115 and the chargers 19 and 119, whereby a user is provided with a usable environment for the notebook PC 10 and the battery packs 25 and 125 are charged. At this time, the battery controller 123 periodically receives data from the power detector 127 and measures the output power P (W) of the AC/DC adapter 111.

In block 207, the battery controller 123 applies the first threshold value Th1 and the second threshold value Th2 embedded in the program to the charger 119 and the charger 19, respectively. In block 209, the battery controller 123 makes a determination as to whether or not the output power P reaches the first threshold value Th1. When the output power P has not reached the first threshold value Th1, as illustrated in (A) of FIG. 2, necessary power is supplied to the charger 19 and the charger 119. Specifically, the charger 19 and the charger 119 are operated with the setting values of the charging current as requested by the battery packs 25 and 125. Although the present embodiment excludes the power consumption of the system load 15/115 as a control subject, the present invention includes a case where the power consumption of the system load 15/115 is controlled on the basis of a threshold value.

The power consumption of the system load 15/115 varies depending on the tasks that a user works with the notebook PC 10. The power consumption of the chargers 19 and 119 increases gradually as long as they are charged in the constant current region. In block 209, as illustrated in (B) of FIG. 2, when the power consumption of any one or more of the three loads increases, and thus, the battery controller 123 determines that the output power P reaches the first threshold value Th1, the flow proceeds to block 211. In block 211, the battery controller 123 decreases the setting value of the charging current of the charger 119 to thereby reduce the power consumption of the charger 119. Moreover, when the charger 119 is charging in the constant voltage region, the battery controller 123 is able to decrease the setting value of the charging voltage or stop the charging completely. The battery controller 123 changes the threshold value of the charger 119 so that the output power P does not exceed the first threshold value Th1.

The battery controller 123 calculates the output power of the AC/DC adapter 111 at predetermined intervals of time and decreases the setting value of the charging current of the charger 119 in order to reduce its power consumption when the output power P exceeds the first threshold value Th1. When the power consumption of either the system load 15/115 or the charger 19 (or both) has increased again, as illustrated in (C) of FIG. 2, it is impossible to prevent the output power P from exceeding the first threshold value Th1 even after the operation of the charger 119 has been stopped.

In block 213, the battery controller 123 makes a determination as to whether or not the output power P has reached the second threshold value Th2. As illustrated in (D) of FIG. 2, when the power consumption of either the system load 15/115 or the charger 19 (or both) has increased again, and thus, the battery controller 123 determines that the output power P has reached the second threshold value Th2, the flow proceeds to block 215.

In block 215, when the battery controller 123 determines that the output power P exceeds the second threshold value Th2, the battery controller 123 instructs the battery controller 23 to decrease the setting value of the charging current of the charger 19. The battery controller 23 changes the setting value of the charging current of the charger 19 in order to reduce its power consumption in accordance with the instruction of the battery controller 123. Moreover, when the charger 19 is charging in the constant voltage region, having received the instruction to reduce the power consumption from the battery controller 123, the battery controller 23 is able to decrease the setting value of the charging voltage or stop the charging completely. Because the maximum power consumption of the system load 15/115 is set within the rated power Pa of the AC/DC adapter 111, as illustrated in (E) of FIG. 2, power is continuously supplied to the system load 15/115.

Figure 4A:
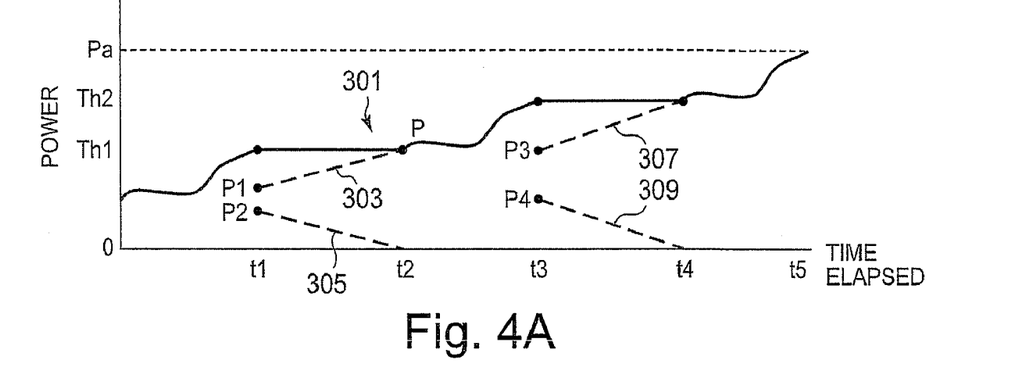
FIGS. 4A-4C are graphs illustrating the variation of output power of an AC/DC adapter with the lapse of time in response to the control of power consumption of a charger.
Figure 4B:
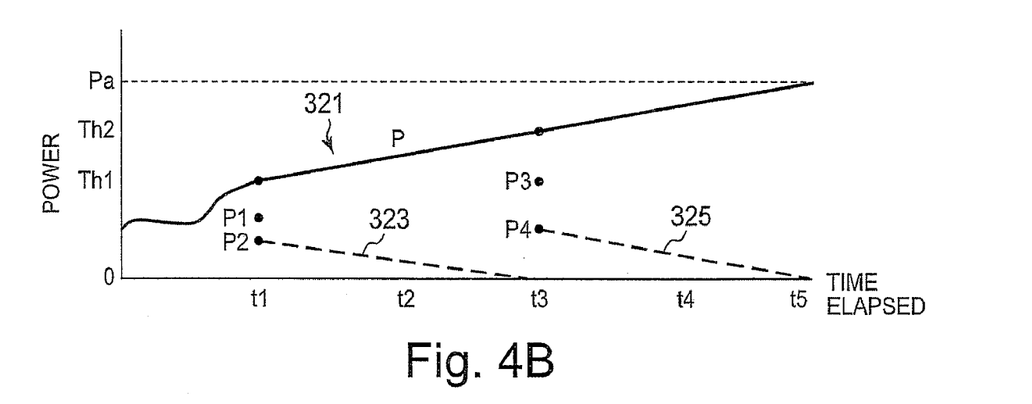
Figure 4C:
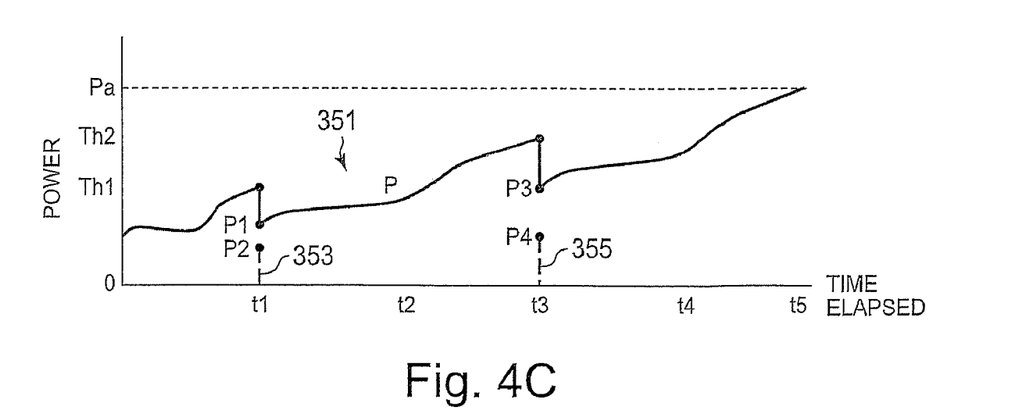

A detailed description of the controlling of the power consumption of the chargers 119 and 19 in blocks 211 and 215 of FIG. 2 is provided in FIGS. 4A-4C. FIGS. 4A-4C are three example graphs illustrating the variation of the output power of the AC/DC adapter 111 with the lapse of time in response to control of the power consumption of the chargers 119 and 19. In the example of FIG. 4A, before time t1, the sum of the power consumption of the system load 15/115, the charger 19, and the charger 119 is identical with the output power P as denoted by line 301. At time t1, the output power P reaches the first threshold value Th1. At this time, let the sum of the power consumption of the system load 15/115 and the power consumption of the charger 19 be P1 and the power consumption of the charger 119 be P2, and a relation of P1+P2=P is satisfied.

After time t1, when the power consumption P1 gradually increases along line 303, the battery controller 123 gradually reduces the power consumption of the charger 119 along line 305. The battery controller 123 decreases the setting value of the charging current of the charger 119 by a predetermined step number when the output power P exceeds the first threshold value Th1 and increases the setting value of the charging current of the charger 119 by a predetermined step number when the output power P is lower than the first threshold value Th1. As a result, the output power P is maintained at the first threshold value Th1.

At time t2, the power consumption P2 reaches zero, and the output power P becomes identical with the power consumption P1. Moreover, during a time between time t2 and time t3, the power consumption P1 increases further, and the output power P reaches the second threshold value Th2 at time t3. At this time, let the power consumption of the system load 15/115 be P3 and the power consumption of the charger 19 be P4, and a relation of P3+P4=P is satisfied. After time t3, when the power consumption P3 gradually increases along a line 307, the battery controller 123 gradually reduces the power consumption of the charger 19 along a line 309.

The battery controller 123 decreases the setting value of the charging current of the charger 19 by a predetermined step number when the output power P exceeds the second threshold value Th2 and increases the setting value of the charging current of the charger 19 by a predetermined step number when the output power P is lower than the second threshold value Th2. As a result, the output power P is maintained at the second threshold value Th2. At time t4, the power consumption of the charger 19 reaches zero, and the output power P becomes identical with the power consumption P3. After time t4, only the system load 15/115 constitutes the load of the AC/DC adapter 111. Therefore, even when the power consumption P3 reaches the rated power Pa at time t5, it is possible to continuously supply the power because the power consumption P3 might not exceed the rated power Pa. Moreover, when the AC/DC adapter 111 has a margin, the power consumption of the charger 119 and the charger 19 may not be controlled to be zero at time t2 and t4, respectively, so that they can continue charging with a small power.

In this control, it can be said that the battery controller 123 controls the power consumption P2 of the charger 119 or the power consumption P4 of the charger 19 so that the output power P of the AC/DC adapter 111 gets closer to the first threshold value Th1 or the second threshold value Th2 when the output power P of the AC/DC adapter 111 exceeds the first threshold value Th1 or the second threshold value Th2. In this control, it is possible to control so that the power consumption P2 of the charger 119 becomes zero or the lowest during a time when the output power P reaches the second threshold value Th2 and that the power consumption P4 of the charger 19 becomes zero or the lowest during a time when the output power P reaches the rated power Pa.

In the example of FIG. 4B, although it is the same as FIG. 4A before time t1, the output power P gradually increases along a line 321 during a time between time t1 and time t3 when the output power P reaches the second threshold value, and the battery controller 123 gradually reduces the power consumption P2 of the charger 119 along line 323 until time t3. After time t3, the output power P gradually increases along line 321 during a time between time t3 and time t5, and the battery controller 123 gradually reduces the power consumption P4 of the charger 19 along a line 325 until time t5. In this example, it is controlled so that the power consumption of the charger 119 becomes zero during a time when the output power P reaches the second threshold value and that the power consumption of the charger 19 becomes zero during a time when the output power P reaches the rated power Pa.

Although the present embodiment controls the power consumption of the chargers 119 and 19 on the basis of only the output power P without measuring the power consumption P2 and P4, this control can be realized by embedding the relationship between the value of the power consumption P and the setting values of the charging current of the chargers 119 and 19 into a program. Specifically, on the basis of power corresponding to a difference between the power consumption P and the second threshold value Th2 and the current setting value in a present operation mode of the charger 119, it is controlled so that the current setting value of the charger 119 becomes zero when the power consumption P reaches the second threshold value. For example, assuming that the current setting value of the charger 119 at time t1 is 10 and a difference between the first threshold value Th1 and the second threshold value Th2 is 20 W, when the output power P is increased to be 5 W higher than the first threshold value Th1, the setting value of the charger 119 is set to 5 while the setting value is set to zero when the output power P is 20 W higher than the first threshold value. Similarly, on the basis of power corresponding to a difference between the power consumption P and the rated power Pa and the current setting value in a present operation mode of the charger 19, it is controlled so that the current setting value of the charger 19 becomes zero when the power consumption P reaches the rated power Pa. Therefore, the shape of the lines 323 and 325 depends on the change of the output power P.

The methods illustrated in FIGS. 4A and 4B are similar in the sense that the power consumption of the charger 119 becomes zero during a time when the output power P reaches the second threshold value and that the power consumption of the charger 19 becomes zero during a time when the output power P reaches the rated power Pa. Although the method of FIG. 4B is more likely to increase the margin of the threshold value than the method of FIG. 4A, it is possible to supply power to the chargers 119 and 19 for a longer period of time.

Although the method in FIG. 4C is the same as FIGS. 4A and 4B before time t1, the battery controller 123 controls so that the power consumption P2 of the charger 119 becomes zero at time t1 along line 353. During a time between time t1 and time t3, the output power P becomes identical with the sum of the power consumption P1 of the system load 15/115 and the charger 19 along line 351. When the output power P reaches the second threshold value at time t3, the battery controller 123 controls so that the power consumption P4 of the charger 19 becomes zero along line 355. After time t4, the output power P becomes identical with the power consumption P3 of the system load 15/115. Although the method of FIG. 4C is able to decrease the margin of the threshold value compared with other methods, the period of time in which power is supplied to the chargers 19 and 119 becomes shorter.

Referring back to FIG. 3, in block 251, the AC/DC adapter 111 supplies power to the system load 15/115 and the charger 119, whereby the user is provided with a usable environment for the notebook PC 10 and the battery pack 125 is charged. In block 253, the battery controller 123 recognizes that the notebook PC 10 is not connected to the docking station 100 or that the notebook PC 10 is connected but the battery pack 25 is not mounted on the notebook PC 10 and applies the second threshold value Th2 to the charger 119. In block 255, the battery controller 123 makes a determination as to whether or not the output power P has reached the second threshold value Th2. When the output power P has not reached the second threshold value Th2, the battery controller 123 supplies necessary power to the system load 15/115 and the charger 119.

Specifically, the charger 119 is operated with the setting value of the charging current provided by the battery pack 125. When it is determined that the output power P has reached the second threshold value Th2, the battery controller 123 reduces the power consumption of the charger 119 in block 257. The control method employs the method described with respect to FIGS. 4A-4C. When the charger 19 having the higher priority is not present, the charger 119 is able to move up a priority thereof so that the power consumption thereof is controlled by the threshold value of the charger 19.

In accordance with the method of FIG. 3, when the rated power of the AC/DC adapter 111 is not sufficient for the charger 19, the charger 119, and the system load 15/115, a higher priority is assigned to the charging of the battery pack 25 by means of the charger 19 than the charging of the battery pack 125 by means of the charger 119 while the power consumption of the system loads 15 and 115 having the highest priority is not limited. Therefore, it is possible to provide a user-friendly computer system. Moreover, in accordance with the method of FIG. 3, since the battery controller 123 is able to control the power consumption of three or two loads by merely measuring the output power P of the AC/DC adapter 111, it is possible to complete the charging of the battery pack 125 in a short period of time by effectively utilizing the surplus power of the AC/DC adapter 111 even when the notebook PC 10 is not connected to the docking station 100.

Specifically, the control method of the present invention can be applied to a case where both or either of the notebook PC 10 and the docking station 100 is equipped with multiple charging systems. Moreover, the control method of the present invention can be applied to a case where an external charger is equipped with multiple charging systems, each having a priority thereof and charging is performed in accordance with the priority of each of the charging systems. Furthermore, when it is determined that a load corresponding to a threshold value having a higher priority is not actually present, the threshold value corresponding to the non-present load is associated with a load having a next higher priority, and the threshold values of the loads having priorities lower than the next higher priority are moved up.

As has been described, the present invention provides a method for controlling output power of an AC/DC adapter and power consumption of a load within a notebook PC.

Although the present invention has been described with respect to a computer system, the present invention may be applied to control of the power consumption of a set of loads that is connected to a common power source. Moreover, although description has been made for a case where there are three loads, the number of loads controlled is not particularly limited. In such a case, threshold values are associated with all of the controllable loads in accordance with a priority thereof, and the power consumption of the load corresponding to a threshold value is limited when the sum of the power consumption of the entire loads reaches the threshold value.

While the invention has been particularly shown and described with reference to a preferred embodiment, it will be understood by those skilled in the art that various changes in form and detail may be made therein without departing from the spirit and scope of the invention.

What is claimed is:

1. A method for charging a portable computer via a docking station, said method comprising:
   determining the total power consumption of a first charger and a first system load within said docking station and a second charger and a second system load within said portable computer in relation to an output power of an AC/DC adapter capable of supplying power to said docking station and said portable computer;
   permitting the power consumptions of said first and second chargers and said first and second system loads to be completely met when the total power consumption of said first and second chargers and said first and second system loads is less than a first predetermined output power threshold of said AC/DC adapter;
   reducing the charging current of said first charger while permitting the power consumptions of said second charger and said first and second system loads to be completely met when the total power consumption of said first and second chargers and said first and second system loads exceeds said first predetermined output power threshold but less than a second predetermined output power threshold of said AC/DC adapter; and
   reducing the charging current of said first and second chargers while permitting the power consumptions of said first and second system loads to be completely met when the total power consumption of said first and second chargers and said first and second system loads exceeds said second predetermined output power threshold but less than said predetermined rating capacity of said AC/DC adapter.

2. The method of claim 1, wherein said reducing the charging current further includes stopping the charging current.

3. A charging system comprising:
   a power source having a predetermined rating capacity;
   a first battery pack;
   a first charger;
   a first system load coupled to said first battery pack and said first charger; and
   a controller for determining whether or not a portable computer to be charged by said charging system includes a second battery pack, wherein said portable computer includes a second charger and a second system load, wherein said controller, in response to said portable computer including a second battery pack,
   permits the power consumptions of said first and second chargers and said first and second system loads to be completely met when the total power consumption of said first and second chargers and said first and second system loads is less than a first predetermined output power threshold of said power source, and
   reduces the charging current of said first charger while permitting the power consumptions of said second charger and said first and second system loads to be completely met when the total power consumption of said first and second chargers and said first and second system loads exceeds said first predetermined output power threshold but less than a second predetermined output power threshold of said power source.

4. The system of claim 3, wherein said controller stops the charging current of said first charger and reduces the charging current of said second charger while permitting the power consumptions of said first and second system loads to be completely met when the total power consumption of said first and second chargers and said first and second system loads exceeds said second predetermined output power threshold but less than said predetermined rating capacity of said power source.

5. The system of claim 4, wherein said controller reduces the charging current of said second charger further includes said controller stops the charging current of said second charger.

6. The system of claim 3, wherein said controller, in response to said portable computer does not include a second battery pack, permits the power consumptions of said first charger and said first and second system loads to be completely met when the total power consumption of said first and second chargers and said first and second system loads is less than said second predetermined output power threshold of said power source.

7. The system of claim 6, wherein said controller reduces the charging current of said first charger while permitting the power consumptions of said first and second system loads to be completely met when the total power consumption of said first and second chargers and said first and second system loads exceeds said second predetermined output power threshold but less than said predetermined rating capacity of said power source.

8. The system of claim 7, wherein said controller reduces the charging current of said first charger further includes said controller stops the charging current of said first charger.

9. The system of claim 3, wherein said controller reduces the charging current of said first charger further includes said controller stops the charging current of said first charger.

10. The system of claim 3, wherein said controller determines power being supplied to said system loads and said chargers according to following descending order of priority—said second system load, said first system load, said second charger and said first charger.

11. The system of claim 3, wherein said power source is an AC/DC adapter.

* * * * *